(No Model.)
O. B. PECK.
PROCESS OF DESULPHURIZING ORES AND DECOMPOSING METALLIC SALTS.
No. 392,456. Patented Nov. 6, 1888.
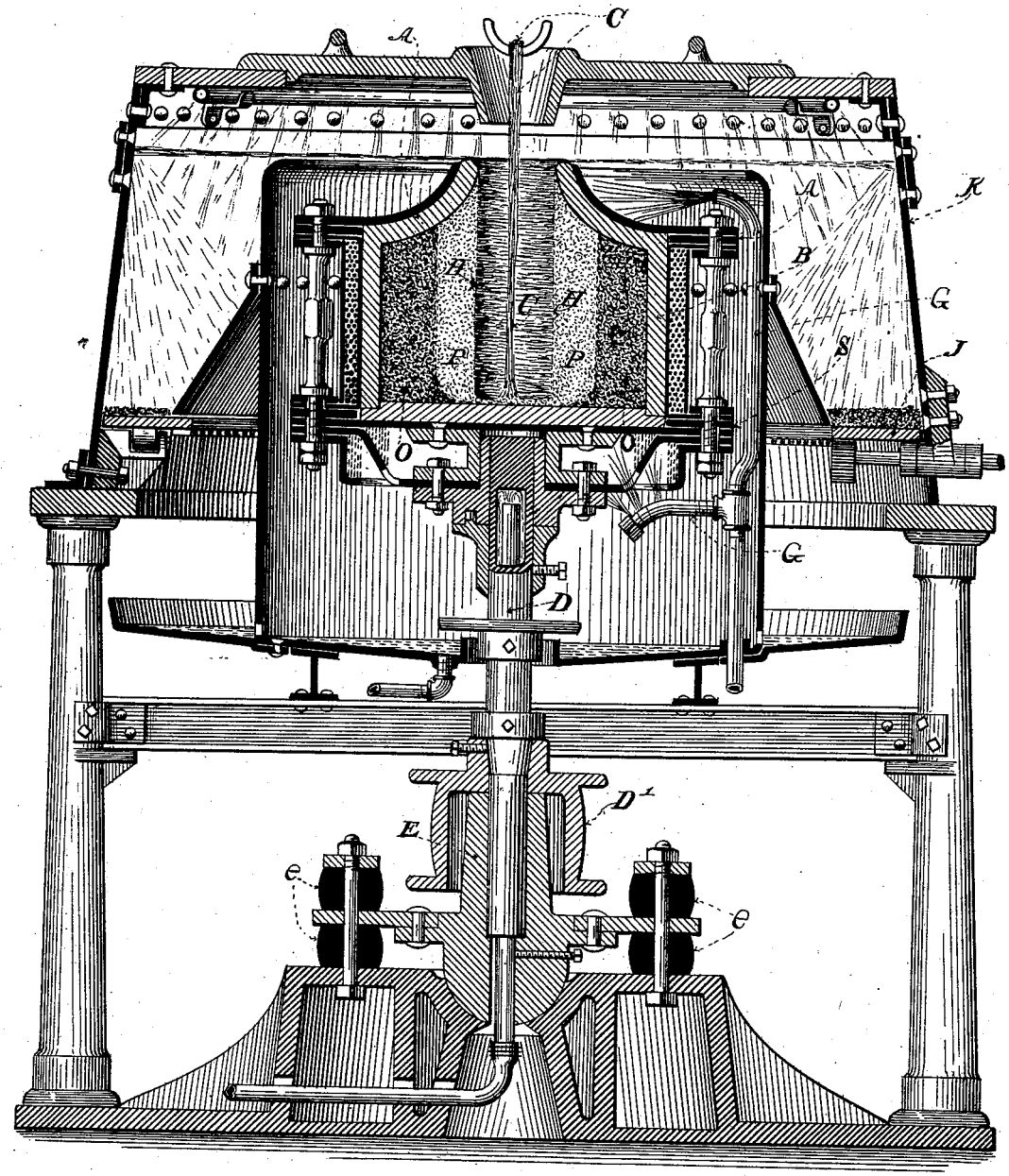
Witnesses:
Chas. E. Gaylord,
Howard S. Bailey.
Inventor:
Orrin B. Peck.

UNITED STATES PATENT OFFICE.

ORRIN B. PECK, OF CHICAGO, ILLINOIS.

PROCESS OF DESULPHURIZING ORES AND DECOMPOSING METALLIC SALTS.

SPECIFICATION forming part of Letters Patent No. 392,456, dated November 6, 1888.

Application filed October 8, 1888. Serial No. 287,546. (No specimens.)

*To all whom it may concern:*

Be it known that I, ORRIN B. PECK, a citizen of the United States, residing at Chicago, in the county of Cook and State of Illinois, have invented certain new and useful Improvements in the Process of Desulphurizing Ores and Decomposing Metallic Salts; and I do hereby declare the following to be a full, clear, and exact description of the invention, such as will enable others skilled in the art to which it appertains to make and use the same.

The object of my invention is to desulphurize ores or metallic compounds carrying a large percentage of sulphur, or to separate the sulphur in a large degree, and to decompose metallic salts or salts of metals and like compounds more or less chemically combined, and, when desired, to recover all or part of the component parts of such materials separated or decomposed in a state of more or less purity with respect to each other.

By the terms "ores," "metallic salts," or "salts of metals" and "metallic compounds" I mean to cover what is commonly known as "pyrites," "sulphides," or "sulphates," and "mattes speiss" and like substances in their varying forms, and all material more or less chemically combined that may be rendered molten or fluid and susceptible to the action of my process, and especially those carrying large percentages of sulphur; but as a matter of convenience I will use the term "sulphide" or "compounds," meaning to cover generically all such substances as above stated.

It is a well-known fact that various kinds of copper, iron, and other ores and matte contain large percentages of sulphur, which in their reduction to a metallic state have to be desulphurized or separated from their sulphur and the compound or compounds composing them decomposed. This separation or "desulphurization," as it is commonly called, is accomplished, principally, by repeatedly roasting the ores or sulphides and matte when it has been reduced to such, and thus by burning or distilling the sulphur, and also largely by smelting the raw sulphides and the roasted with various fluxes to chemically combine with the sulphur and carry it off in the slags in the case of the treatment of the copper sulphides, as the copper is usually the metal desired to be recovered.

The copper sulphides or sulphide ores, with more or less iron in a sulphide state and other materials which accompany it, are reduced much in the way above described to a matte, carrying various substances in addition to the copper—such as iron, residues, and the sulphur, which is usually of a large percentage and more or less gold and silver. The process of reducing the ores to this matte is expensive and tedious, and the matte when obtained has to be treated chemically or electrically to further desulphurize and decompose it to obtain the copper in a metallic state and to separate and finally recover the gold and silver from it.

In all cases of treatment at the time of smelting in any of the various ways where the sulphides and materials under treatment are reduced to a fused or fluid state the elements or materials forming the molten compound are rendered free to move because of their high temperature, and are of different densities; but as the difference in the densities of the several elements composing the compound is not great enough to overcome the cohesion between them they are held by this affinity from separation into their several or respective parts by gravity. For this reason it will be understood that there is a difference in the separation of materials, the component parts of which have different specific gravities or are chemically combined or united—as the salts of metals and like substances, as before described—which will not settle or separate by their own gravitation in the order of their specific gravity while in a molten or fluid state, because they are held in union as a whole or compound by chemical affinity, and mixtures the component parts of which also have different specific gravities, and which under like conditions will separate by their own gravitation in the order of their specific gravity.

I have discovered that by a process of subjecting the fused sulphides or materials to a sufficiently-developed centrifugal action the chemical union or affinity of the component parts of these compounds may be very largely, if not wholly, broken or overcome, and the sulphur and other materials may be all or both separated by the force so developed in a state of greater or less purity with regard to each other and in order of their specific gravity, thus largely or wholly decomposing the compound.

As the principle or force employed in my process is founded upon the law of gravitation, it is obvious that it is necessary to have the sulphides or materials fluid or in a state of fusion while being acted upon. The heat also reduces the chemical affinity or the intensity of the chemical union of the sulphur and its base or basis or the materials combined and renders it more susceptible to an action to overcome their union and separate them.

As an illustration in the desulphurization or decomposition of molten copper or iron sulphides or matte by my process, the copper and iron have a specific gravity about four times that of sulphur, and for a comprehensive understanding I will call the specific gravity of the sulphur one unit and that of the iron and copper three units greater, and I will call the chemical affinity uniting them with the sulphur nine hundred units, or three hundred times as great as the difference in the specific gravity. Now, by subjecting this molten compound to a highly-developed centrifugal action, the chemical affinity between the various elements of it is not increased, and as by the law of such action the centrifugal force increases as the square of the number of revolutions to which the material being treated is subjected the difference in the force exerted on two or more elements of the compounds, by reason of their different specific gravity, will soon be multiplied by such action until it exceeds and overcomes their chemical affinity or the nine hundred units, when they will be separated into their several elements in a state of greater or less purity and in the order of their specific gravity. They may then be divided while in a molten state and are being acted upon and held separate by centrifugal force, or they may be retained under centrifugal action until cooled or hardened; but it will be necessary to either divide the several constituents or elements of the compound after they are separated and while under the influence of a sufficient centrifugal action to prevent them from chemically reuniting, or to retain them under such action until they are sufficiently cooled to become hardened, in which condition they cannot be reunited.

In all cases of the desulphurizing of sulphides by roasting, &c., as above described, little or none of the sulphur is saved, while by my process it may be separated and collected in a greater or less state of purity as one of the component parts of the compound acted upon with comparatively little trouble.

In the use of my process herein described it is obvious that the centrifugal action must be developed in all cases to a sufficient degree, so that the difference in the specific gravity of the two or more elements of the compound being acted upon and to be decomposed or separated will exceed and overcome in a greater or less degree the intensity of the attraction or chemical affinity holding them in union; and of course it will be understood that in carrying out my process I must bring the materials to be treated to a fused or fluid state while being acted upon, and that to subject them to the centrifugal action required I place them in a suitable vessel adapted to be rotated and revolve them very rapidly.

For a clear understanding of my process, I have annexed the accompanying drawing, and will here describe the illustrated apparatus for carrying it out; but I do not wish or intend to claim this apparatus, as the same is an improvement or improvements in centrifugal machines invented by Phineas H. Adams, Jr., of Chicago, and which is not yet patented by him. It is obvious, however, that any centrifugal machine may be used that is adapted to stand the great strain and possessing the conditions required for the work.

In making an apparatus for carrying out my process I provide a revoluble tub or vessel, A, adapted to receive the molten materials, preferably mounted upon the upper end of and carried by a vertical spindle, (represented by D,) which is provided with a belt-wheel, (represented by D',) by which it is revolved, carrying with it the revoluble tub or vessel A. The spindle D is journaled in and supported by a suitable box, E, which is preferably secured to a suitable frame-work by the cushions e, so as to be flexible. The tub or vessel A is made of sufficient strength to withstand the great centrifugal force while in use, and preferably is arranged to stand vertically with an opening in its top somewhat smaller than the diameter of the body of the vessel, so as to leave an annular overhanging ring or portion, as is shown in the drawings. I also prefer to provide this vessel with a suitable lining, B, of cast-iron, and make the lining and outer shell separable in two or more parts by any well-known means, which in this case is at the point S. The object of making it separable is to facilitate the removal of the valuable or hardened material within. I further preferably provide a curb, K, to catch the molten material as it is discharged from the vessel A, if there be any discharged, and a revolving table, J, to carry it away. I also prefer to provide a water or steam pipe, G, to keep the exterior of the vessel A cool, and such other parts as may be necessary to the convenient operation of the machine, all of which may be varied to suit the operator or conditions of operating.

In carrying on my process I take the molten compounds that I have herein described to be separated or decomposed. I preferably first cause the vessel A to revolve very rapidly by means of a belt conveying motion from any suitable source of motive power and the pulley D'. I pour the molten compound C into the vessel through the hole in the top, and as it falls on the bottom of the vessel it will be thrown instantly to the sides of the vessel by centrifugal force, and as it continues to flow in it will continue to be thrown to the sides of the vessel and assume a vertical position, forming an annular wall, H, as shown in the drawings, until the vessel has become filled to the inner edge of the annular overhanging ring or portion. The molten compound thus revolved in the vessel, if its rotation be sufficiently rapid so that the centrifugal force developed or exerted on the various elements of the compound based upon their different densities to overcome their attraction or chemical affinity, the compound will be wholly or in part decomposed, and the elements separated in the order of their specific gravities, as indicated by the letters O P in the drawings, the heavier elements will be thrown to the exterior and the lighter will occupy the interior of the molten mass, and the charge may be divided in the way that may best suit the operator, either by revolving the machine until the charge is cooled and hardened, and then assorting them after their removal from the vessel, or he may continue to pour more of the molten compound in the vessel, allowing the lighter properties to be discharged and retaining the heavier.

What I claim as new, and desire to secure by Letters Patent, is—

1. A process of desulphurizing materials, which consists in bringing such materials to a state of fusion and subjecting them to a sufficiently powerful centrifugal force to overcome wholly or in part the chemical affinity of the combination, substantially as described.

2. The process of decomposing metallic salts or salts of metals and like compounds, which consists in subjecting them to a highly-developed centrifugal action while in a molten state, substantially as described.

In testimony whereof I affix my signature in the presence of two witnesses.

ORRIN B. PECK.

Witnesses:
JESSE E. PECK,
ORSEMAS T. X. ADAMS.